May 22, 1934.   G. RIES   1,959,548

STEERING GEAR FOR MOTOR CARS

Filed Jan. 3, 1933

INVENTOR:
Gottfried Ries

Patented May 22, 1934

1,959,548

UNITED STATES PATENT OFFICE 1,959,548

STEERING GEAR FOR MOTOR CARS

Gottfried Ries, Karlsruhe, Baden, Germany

Application January 3, 1933, Serial No. 649,838
In Germany January 2, 1932

2 Claims. (Cl. 280—95)

(Granted under the provisions of sec. 14, act of
March 2, 1927; 357 O. G. 5)

My invention relates to steering gears for motor cars of every kind provided with two or more steering wheels. The main objects of my invention are firstly to effect the steering in such manner that no shocks are transmitted to the steering gear and to the hand wheel, and this without the aid of damping organs rendering difficult the steering; secondly to provide a steering gear which is stable and secured against lateral shocks, twists, wobbling and the like; thirdly to hinge the steering wheels in such manner that they suffer no lateral displacement in their up and down movement, but follow their true track; and fourthly to protect the bearings of the steering swivel journals and the whole steering gear from the shocks exerted on the wheels by unevenness of the road surface, by disposing the suspension springs ahead of the bearings of the steering swivel journals so as to absorb the shocks before they are transmitted to these bearings, and to keep the masses, that are not spring suspended, as small as possible.

Figure 1:
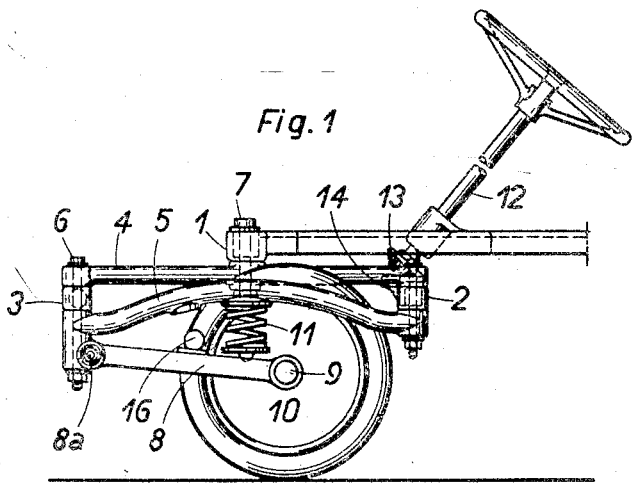
Figures 2, 3:
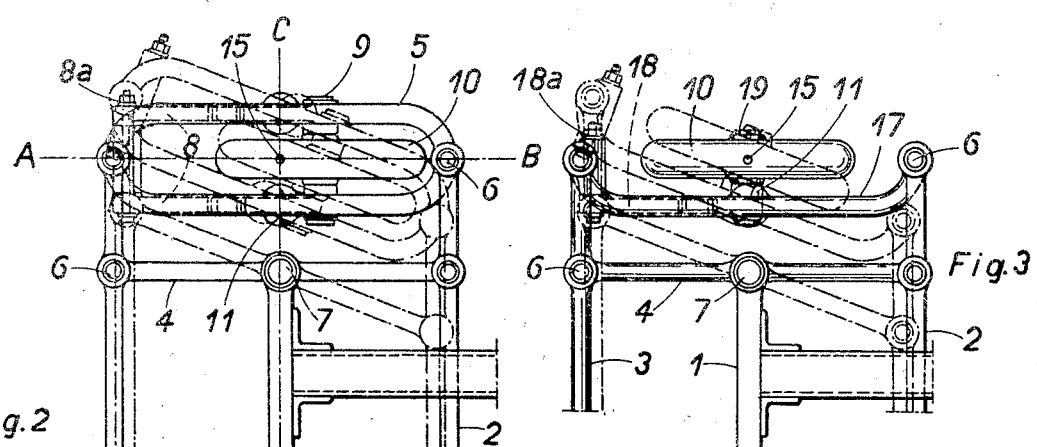

With these and other objects in view, my invention consists in the combination of parts to be hereinafter more fully described and claimed and illustrated in the accompanying drawing, in which Figure 1 is a side view of one embodiment of my invention, Figure 2 is a plan view of the same, and Figure 3 is a fragmentary plan view of a somewhat modified construction of parts of the device.

Referring to Figs. 1 and 2, 1 is the front cross member of the rigid car frame, 2 and 3 are two further cross members, 4 are two inner straight rod shaped longitudinal members, and 5 are two outer ear shaped longitudinal members. The members 2, 3, 4 and 5 are pivotally connected together at 6 so as to form a triple articulated parallelogram, and the members 4 are pivotally connected to the ends of the member 1 at 7. 8 are two pairs of levers hinged to the front end of the members 5 at 8a so as to be movable up and down and carrying at their free ends the journals 9 of the steering wheels 10. 11 are helical springs interposed between the members 5 and the levers 8.

The steering pillar 12 carries at its lower end a bevel wheel 13 engaging a rack 14 secured to the rear cross member 2. By turning the pillar 12 the cross members 2 and 3 are displaced laterally in opposite directions, wherein the members 4 oscillate about the pivots 7 and the members 5 together with the wheels 10 oscillate about the axis 15 formed by the lines in which the wheel planes A—B are crossed by the plane C—D passing through the pivots 7. Thus the axis of oscillation of the wheels are disposed within the wheel planes, whilst the steering pivots are disposed between the two wheels.

The suspension springs 11 being disposed ahead of the bearings of the steering swivel journals 7, there are behind the bearings of the wheels no bearings that are not spring suspended. Thus the masses of the car that are not spring suspended are restricted to a minimum; furthermore the bearings of the steering swivel journals and the whole steering gear are protected from shocks. For the same purpose between the members 5 and the levers 8 there are interposed also blocks 16 of rubber or other elastic material. At the same time it is absolutely secured that the wheels are caught in case of breakage of the springs.

In the modified construction shown in Fig. 3 there is provided a curved longitudinal member 17 instead of an ear shaped member as shown in Fig. 2 and a single lever 18 formed integrally with the journal 19 of the steering wheel 10. Furthermore there is provided only one spring 11 positioned directly upon the journal 19 instead of two springs positioned upon the levers 8 at a short distance from the journal 9 as shown in Fig. 1 and and 2. Instead of the helical springs 11 shown plate springs may be provided that are positioned at both sides of the wheels and suspended on the members 5.

In the drawing the members 3, 4 and 5 are simply shown as tubes and the member 2 is shown as a rod of rectangular cross-section; but in reality these members may of course be of channel or any other suitable section. Similarly instead of ordinary pivots as shown there may be applied roller or ball bearings of any suitable construction. Or, as the pivots connecting the levers 8 or 18 to the members 5 or 17 and the bearings of these pivots are exposed to great stress and wear caused by shocks and may often lack of sufficient lubrication, and as there are only very small oscillations of these pivots, their bearings may be lined with rubber or any other elastic material. By these means any wear of the bearings is avoided and lubrication is no more necessary.

As the axis of oscillation of each wheel is independent of the steering journal bearing, it can be positioned at any point of the wheel plane, whilst the said bearing can be positioned at any point upon the member 4. In the case of front wheel drive it will be useful to contract the steering gear in such manner that the axis of oscillation and the axis of rotation are crossing each other. But in other cases it will be of great advantage to position the axis of rotation of the wheels behind the axis of oscillation i. e. nearer to the centre of gravity of the car, as by these means wobbling of the wheels is prevented and particularly the heavy shocks (i. e. when one wheel is running over a stone or the like) do not act upon the wheel directly from a point vertically below the axis of rotation, but are acting from a point at a certain distance in front of the said axis so that the steering is not influenced, but the shocks are received by the steering journal bearings. Thus the wheel, when receiving shocks only from one side at a time and even when following a curved track, will not leave its track but be tending to slowly return into a straight track according to the moving direction of the car.

In order to prevent that the entire moment of forces tending to capsize the whole steering gear solely act upon the two main steering journal bearings, both or only one of the two cross members 2 and 3 may be supported by additional sliding surfaces or by rollers.

As it is entirely impossible that any shocks are transmitted to the steering pillar and to the hand wheel, no shock absorbing means or self locking worm gear is needed. According to the invention all the intermediate members, such as are worm, worm segment, steering lever and controlling rod of steering gear may be dispensed with, and the movement of the hand wheel has to be communicated only by means of a tooth wheel and a toothed rack to the rear cross member 2 which has taken the place of the former connecting rod of steering gear. This can be effected either by the toothed rack 14 solidly secured to said cross member or thru the interposition of a connecting rod jointed to this cross member or mounted on the same between rubber cushioned bearings.

The main object of this invention compared with the steering gears previously constructed is, that the steering gear is not influenced by any shocks; further that, whilst the axis of rotation of a wheel is positioned in the wheel-plane, the main steering journal bearings can be provided at any suitable distance from the latter. By this construction it is, as already stated, possible to secure enough space for the brake drums, propeller shaft or shafts etc. and to provide axle bearings of great length so that the wheels will be caused always to follow their true tracks; further that, in spite the steering gear being of stable construction, the masses not suspended by springs are reduced to the utmost limit; still further, that the steering gear can be operated with very little effort, as no worm gear requiring a relatively large part of the effort exerted is applied and the main steering journal bearings may be constructed as roller or ball bearings; consequently the gear ratio between the angle of rotation of the hand wheel and the oscillatory movement of the wheels can be chosen near a ratio of 1:1.

What I claim as my invention and desire to secure by Letters Patent is:

1 In a motor car the combination of a rigid car frame, a pair of steering wheels, journals for said wheels, two cross members extending over the whole wheel track, four longitudinal members, said cross members and said longitudinal members being pivotally connected together so as to form a triple articulated parallelogram, and the two inner of said longitudinal members being pivotally connected to said car frame, and springs interposed between the two outer of said longitudinal members and said journals and connecting these parts together.

2. In a motor car the combination of a rigid car frame, a pair of steering wheels, journals for said wheels, two cross members extending over the whole wheel track, four longitudinal members, said cross members and said longitudinal members being pivotally connected together so as to form a triple articulated parallelogram, and the two inner of said longitudinal members being pivotally connected to said car frame, levers hinged to the front end of the two outer of said longitudinal members so as to be movable up and down and carrying at their free ends said journals, and springs interposed between the two outer of said longitudinal members and said levers.

GOTTFRIED RIES.